Figure 5:
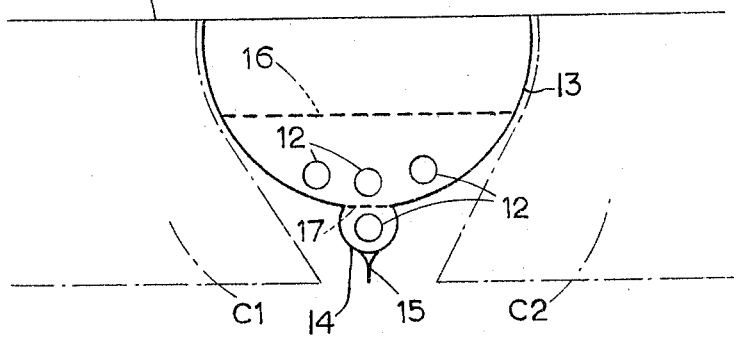

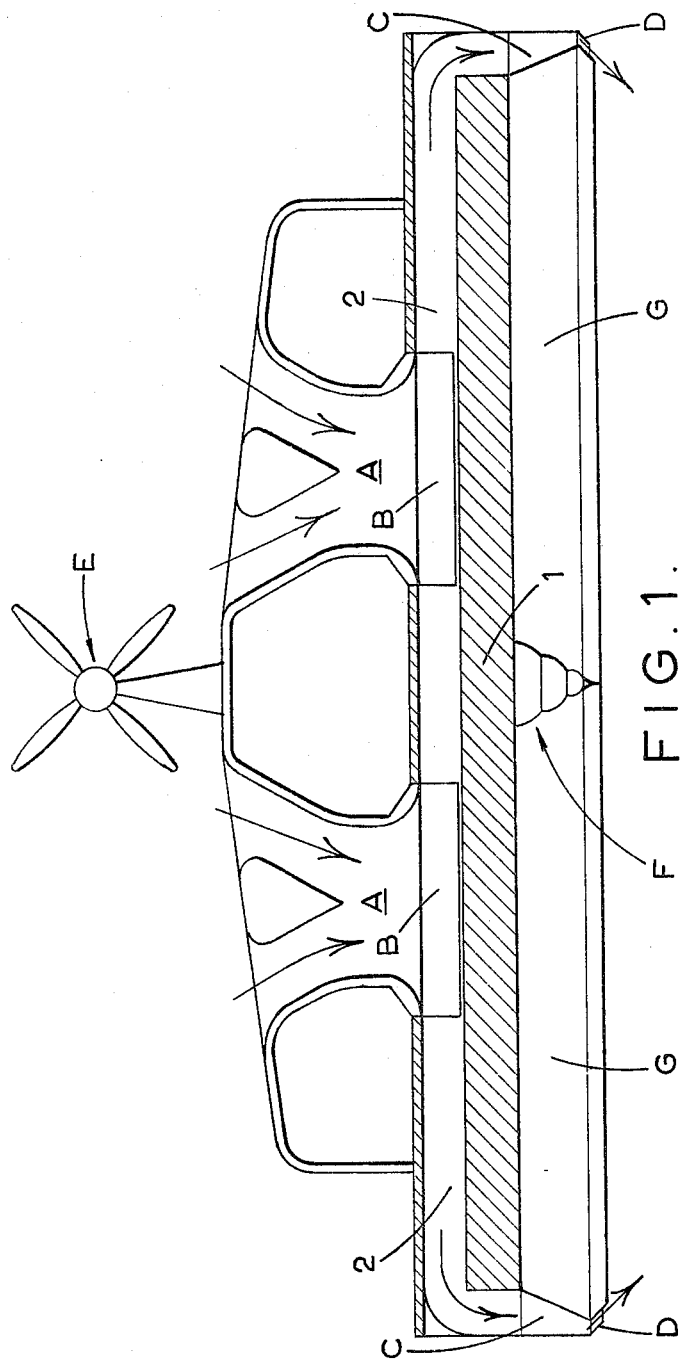

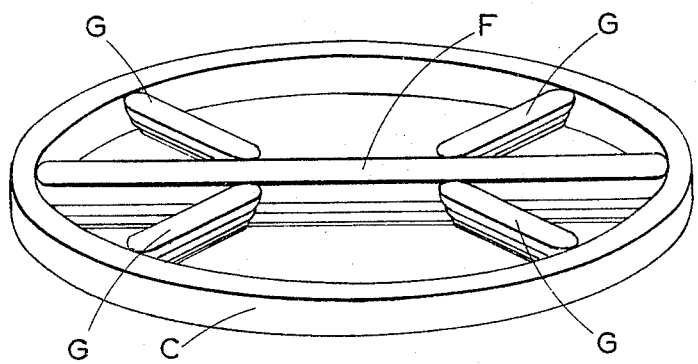
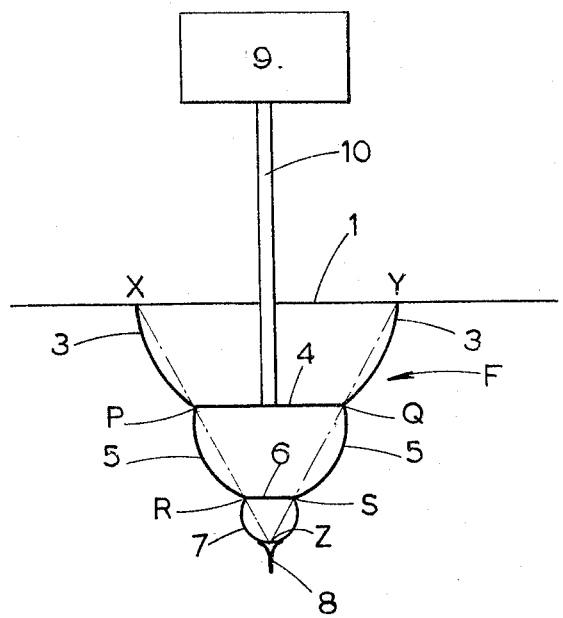

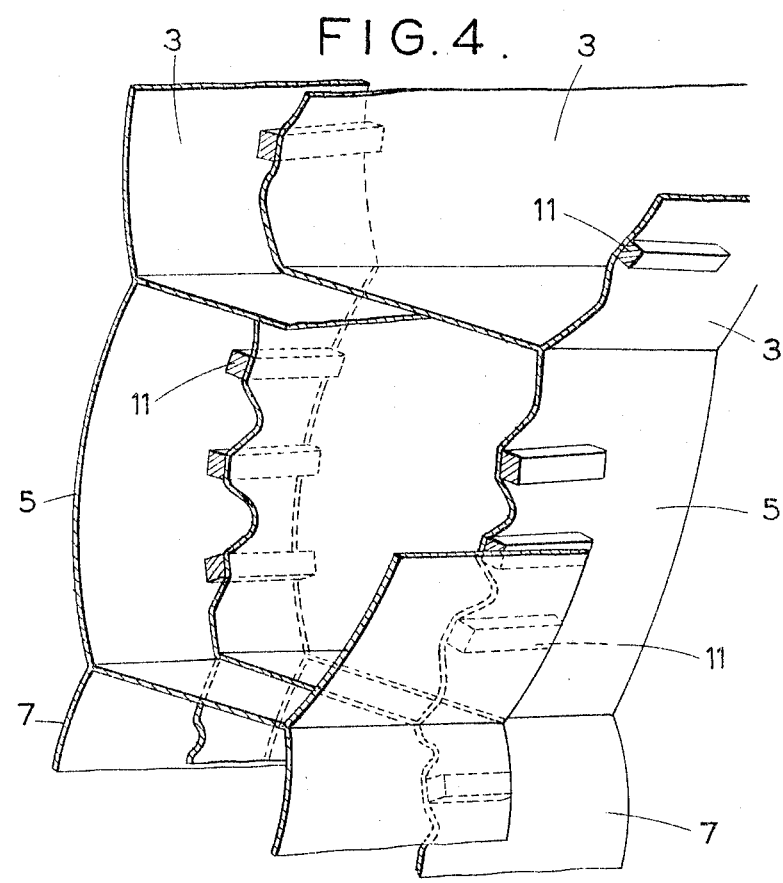

United States Patent Office 3,291,241
Patented Dec. 13, 1966

3,291,241
FLEXIBLE UNDERSTRUCTURES FOR GROUND EFFECT VEHICLES
Richard Stanton Jones, Cowes, Isle of Wight, England, assignor to Westland Aircraft Limited, Yeovil, Somerset, England
Filed July 15, 1964, Ser. No. 382,866
Claims priority, application Great Britain, July 27, 1963, 29,882/63
10 Claims. (Cl. 180—7)

This invention relates to air cushion vehicles or ground effect machines of the type which, during at least one mode of operation, are wholly or partially supported by a pressurised gaseous cushion generated under the machine, the gaseous cushion being of air or other gas, or a mixture of gases hereinafter referred to as a gaseous cushion.

In the past, machines of this type have been proposed, in which a main gas discharge system discharged pressurised air or other gaseous mixture from the bottom of the machine, for example through side, end, or peripheral downwardly-extending walls or skirting, so as to generate a gaseous cushion and to retard dissipation of the gaseous cushion upon which the machine rode. Moreover, downwardly-extending walls or keels were arranged to partition the overall cushion area and pressurised stabilising gas discharged from the bottom of these walls or keels so as to cause, upon pitching or rolling, creation of a pressure differential within the overall cushion area, which imparted a righting moment to the machine. Generally, at least those parts of the walls or skirting, partitions or keels likely to be subjected to primary wave or obstacle impact were of flexible construction.

According to the invention, a ground effect machine of air cushion vehicle of the type which, during at least one mode of operation, is wholly or partially supported by a pressurized gaseous cushion formed and contained beneath the machine has at least one keel which comprises an elongated flexible container depending downwardly from the machine within the cushion area, the vertical cross-section of the keel being bulbous over at least a substantial portion of the length of the keel, the bulbous cross-section presenting two or more superimposed bubbles, adjacent bubbles being separated by a substantially horizontal member, and each bubble except the uppermost one having a smaller cross-sectional area than the one immediately above, the flexible container being constructed and arranged to be inflated by gaseous fluid under pressure, and being provided with vents for the escape of the gaseous fluid and of any water that may find its way into the container. Other novel features and characteristics of the invention in its preferred form will be apparent from the ensuing description and the accompanying illustrations.

It has been discovered during extensive research and experiment that an air cushion vehicle or ground effect machine has good pitching or roll stability when provided with lightweight downwardly-extending walls or keels arranged to partition the overall cushion, the cross-section of the walls or keels being designed to approximate to the shape of an isosceles triangle having its width equal to its depth. However, cross diaphragms are necessary in each such wall or keel to maintain its shape. Such diaphragms can be avoided by making use of the aforesaid bulbous construction, and this can very effectively be applied by shaping the container so that, in cross-section, it presents two or more superimposed bubbles, adjacent bubbles being separated by a substantially horizontal web, and each bubble, except the uppermost, having a smaller cross-sectional area than the one immediately above. Then the cross-section of the container contains the triangle and the sides of each bubble present arcs that lie outside the triangle with their extremities on the sides of the triangle, and the sides of the lowermost bubble meeting at the apex of the triangle. Such an arrangement provides good obstacle clearing capabilities and, when under internal pressure, is substantially self-sustaining without the aid of cross-diaphragms. However, a few such diaphragms may be provided in a fore and aft keel to act as baffles preventing an undesirable rush of water to the aft end of the keel when the machine takes off from a water surface.

Figure 6:
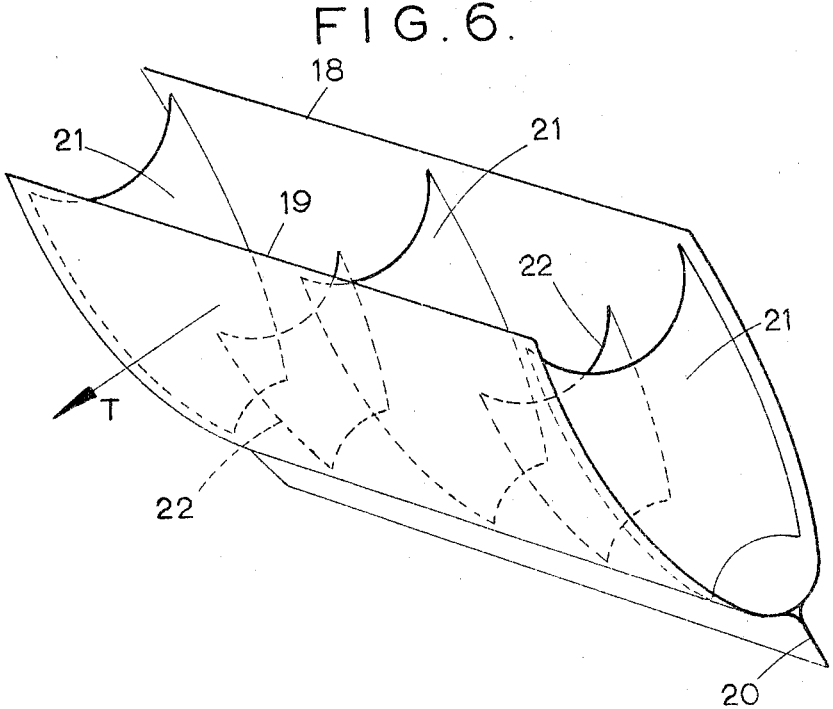

In order that the invention may be clearly understood and readily carried into effect, constructions in accordance therewith will now be described, by way of example, with reference to the accompanying drawings, in which:

FIGURE 1 is a cross-section athwart an air-cushion vehicle or ground effect machine, FIGURE 2 is a perspective view showing a flexible under structure of the machine of FIGURE 1, FIGURE 3 is a diagrammatic cross-section through a forward portion of a keel in the under structure of FIGURE 2, FIGURE 4 is a perspective view of portion of the keel, FIGURE 5 is a diagrammatic cross-section through a rear portion of the keel, and FIGURE 6 is a diagrammatic perspective view of a portion of a stability wall for use in the under structure of FIGURE 2.

FIGURE 1 shows a flat-bottomed ground-effect vehicle having a rigid bottom structure 1. Above this there is a hollow space forming a plenum chamber 2, fed through vertical ducts A by fans B beneath the ducts A. The air is discharged from the plenum chamber 2 through peripheral skirting C (FIGURES 1 and 2), whence it is delivered through a peripheral nozzle D inclined towards the centre of the vehicle to provide the air-cushion. The vehicle is propelled by one or more air propellers E.

The vehicle is provided with a longitudinal keel F running fore and aft of the machine and with stability walls or keels G extending between the keel F and skirting C as shown in FIGURE 2. The skirting C with its nozzle D and the keel F and stability walls G are all made of flexible material.

The keel F consists mainly of a container which, over the major portion of its length has the cross-section shown in FIGURE 3 in that it comprises interconnected bubbles, or arcs, enclosing an isosceles triangle XYZ having its base or width equal to its depth or height. The side walls 3 of the upper bubble are attached to the rigid bottom structure 1 along the parallel axes X, Y and the lower edges touch the triangle along axes P, Q where they are joined by a horizontal web 4. The intermediate bubble has side walls 5 extending between the axes P, Q and axes R, S on the triangle, the walls 5 being joined between the axes R, S by a horizontal web 6. The bottom bubble 7 touches the apex Z of the triangle and carries a flexible rubber blade 8. It is to be understood, however, that the keel F is only maintained in this precise shape by being fed with gas, e.g., air, under pressure from a source 9 through ducting 10. The source 9 may be the source, the main purpose of which is to generate and maintain the gaseous cushion. The longitudinal webs 4, 6 are formed with large ports so as to allow communication from one side of each web to the other, enabling the entire keel to be kept inflated. While the keel F is kept inflated the air escapes therefrom through discharge vents. These discharge vents are provided by constructing the keel container in separate lengths, which may be about ten feet long, and providing lap joints between them as shown in FIGURE 4. However, at the locations where the sides 3, 5, 7 have their lap joints, the overlapping portions are separated by plastic or wood blocks 11. Bolts and nuts (not shown) pass through the overlapping parts of the sides 3, 5, 7 and through the blocks 11 to secure them together. Also the overlapping portions of the webs 4, 6 are in practice bolted together. The blocks 11 cause gaps to form between the overlapping lengths of the keel container.

The tail end of the keel F may consist of a two bubble arrangement, a rear view of such an arrangement being shown in FIGURE 5. It will be seen that the after part of the keel projects between two sections C1, C2 of the skirting but is quite separate from these sections. The back of the keel is closed by a diaphragm formed with vents 12.

The top bubble 13 of the two-bubble portion of the keel is arranged so that its arcuate walls overlap outside the arcuate walls 3, 5 of the three-bubble portion, spacing blocks being provided between the walls of the bubble 13 and the walls 3, 5. Flexible gussets may also be arranged to connect these portions, and also to connect the lower bubble 14 of the two-bubble portion to the bottom bubble 7 of the three-bubble portion. A blade 15 at the bottom of the two-bubble portion constitutes a continuation of the blade 8 of the three-bubble portion. Internal webs 16, 17 constitute continuations of the webs 4, 6.

The stability walls or keels G are quite separate from the keel F and from the peripheral skirting C, and they may be of the same general construction as the keel F, having either the cross-section of FIGURE 3 or that of FIGURE 5. The stability walls G may be vertical or they may be inclined downwardly towards the aft end of the ground effect machine to improve their obstacle clearing capabilities. They may be fed with gas under pressure from the source 9 or from any other convenient source, discharge vents being formed in the rearward facing wall of the lower bubble. Like the keel F, the stability walls G are furnished at the bottom with blades, such as 8, 15.

An alternative form of stability wall G appears in FIGURE 6, which shows a section of the wall. It consists of an envelope of basically elliptical section truncated at its upper end to provide edges 18, 19 that are fixed to the rigid bottom structure 1 of the vehicle. A flexible blade 20 is fixed to the bottom of the wall in the major axial plane of the ellipsoidal wall. This plane is inclined downwardly and rearwardly to make an angle of seventy-five degrees of arc to the horizontal, the direction of travel, when in use, being roughly as indicated by the arrow T. This wall has no vents and is kept stiff, when required, by the supply of air under pressure to the interior. The form of the wall is then stabilized by vertical deep splitter webs 21 and shallow splitter webs 22. These webs have arcuate top and bottom edges to provide for ready passage of the compressed air to all parts of the wall.

Any part of the longitudinal keel F that co-operates with another portion of the flexible system of FIGURE 2, such as the forward end of the keel, is shaped to suit the profile of the co-operating component, thereby substantially restricting the air flow therebetween. However, the co-operating components are not connected to each other because, for example, if the forward end of the keel is connected to the inner surface of the skirting C, serious damage can result from the trapping of water when the machine is ditched, i.e., rapidly deprived of the supporting air cushion. The way that the rear portion of the keel F fits between the sections C1, C2 of the skirting is clear from FIGURE 5.

After the construction of the assembly of FIGURE 2 has been completed, the longitudinal blades, such as 8, 15, 20, are shaved or trimmed so that the bottom of the longitudinal and stability keels F, G is the same plane as the bottom of the peripheral nozzle D, when the machine is in operation. This facilitates manufacture and the assembly of the machine. The provision of the longitudinal and stability keels with flexible blades results in superior aerodynamic stability relatively to a ground effect machine having bubble keels extending to the same depth as the peripheral skirting assembly and not provided with the flexible blades, because air flow past the blades is less than that past the bubble. Moreover, the flexible blades reduce drag over water and abrasion of the bubble portions of the keels over land.

When the ground effect machine is performing translational movement in the water, the gaseous cushion is not being maintained and the longitudinal and stability keels F, G are immersed in the water in their deflated state. Upon transition to the cruising condition, when the ground effect machine is supported on its gaseous cushion, it is desirable to discharge the water that has collected in the longitudinal and stability keels, as quickly as possible, since the presence of water increases the total weight of the machine and this in turn lengthens the time taken for transition. Although the vents constitute means whereby the longitudinal and stability keels F, G are flooded when the ground effect machine is performing translational movement in the water, these vents allow escape of water entering the longitudinal or stability keels along with the inflating air or other gas. Water enters in this way, as a result of the ground effect machine making a sudden and substantial impact with water, such as upon ditching or impact with a large wave, whereupon water floods into the source of air or other gas. More generally however, the water enters with the air drawn in from the ambient atmosphere to feed the said source, this water being constituted by spray when the ground effect machine is operating over water.

In practice the first stage of transition to the cruising condition is a rising of the bow of the ground effect machine, whereupon the entrapped water flows towards the aft of the machine and is discharged through the vents as the vents rise above the surface of the water. The discharge of water is accelerated by the action of the air or other gas entering and inflating the longitudinal and stability keels F, G.

In a modification the double bubble portion of the keel F is blended into a single bubble portion of the keel at the aft end of the machine. The bubble portions of the keels F, G are made of rubberised fabric and the blades 8, 15, 20 are of rubber. The individual bubbles may be made by folding over lengths of flexible material to provide longitudinal lap joints secured by bolts and nuts.

I claim as my invention:

1. A ground effect machine of the type which, during at least one mode of operation, is wholly or partly supported by a pressurized gaseous cushion formed and contained beneath the machine, said machine having at least one keel which comprises an elongated flexible container depending downwardly from the machine within the cushion area, the vertical cross-section of said keel being bulbous over at least a substantial portion of the length of the keel, the bulbous cross-section presenting two or more superimposed bubbles, adjacent bubbles being separated by a substantially horizontal web, and each bubble except the uppermost one having a smaller cross-sectional area than the one immediately above, said flexible container being constructed and arranged to be inflated by gaseous fluid under pressure, and being provided with rearwardly opening and continuously open vents for the escape of said gaseous fluid and of any water that may find its way into the container.

2. A machine according to claim 1, furnished with a peripheral skirting having a nozzle through which air or other gas for the cushion is delivered, the said keel extending fore and aft between the fore and aft portions of the skirting, and stability keels being provided between the sides of the said keel and the sides of the skirting.

3. A machine according to claim 2, in which each stability keel consists of an elongated flexible container, the vertical cross-section of which is bulbous, arranged to be inflated by air or other gas, and a blade extending along the bottom of the container in a substantially vertical plane.

4. A machine according to claim 1, having a blade extending along the bottom of the container in an approximately vertical plane.

5. A machine according to claim 4, in which the blade lies in a plane that divides the container longitudinally into two equal volumes.

6. A machine according to claim 1, in which the container, in cross-section, substantially outlines points of an isosceles triangle having its width approximately equal to its depth, the sides of each bubble presenting arcs that lie outside the triangle with their extremities on the sides of the triangle, and the sides of the lowermost bubble meeting at the apex of the triangle.

7. A ground effect machine of the type which, during at least one mode of operation, is wholly or partly supported by a pressurized gaseous cushion formed and contained beneath the machine, said machine having at least one keel which comprises an elongated flexible container depending downwardly from the machine within the cushion area, the vertical cross-section of said keel being bulbous over at least a substantial portion of the length of the keel, the bulbous cross-section presenting two or more superimposed bubbles, adjacent bubbles being separated by a substantially horizontal member, and each bubble except the upper-most one having a smaller cross-sectional area than the one imediately above, said flexible container being constructed and arranged to be inflated by gaseous fluid under pressure, and being provided with vents for the escape of said gaseous fluid and of any water that may find its way into the container, said keel being a fore and aft keel with the container made in lengths, adjacent lengths being joined by a lap joint arranged to provide gaps between the overlapping ends of the lengths to form said vents.

8. A machine according to claim 7 wherein said gaps face rearwardly of the machine and extend upwardly and downwardly along the sides of said container.

9. A ground effect machine of the type which, during at least one mode of operation, is wholly or partly supported by a pressurized gaseous cushion formed and contained beneath the machine, said machine having at least one keel which comprises an elongated flexible container depending downwardly from the machine within the cushion area, the vertical cross-section of said keel being bulbous over at least a substantial portion of the length of the keel, the bulbous cross-section presenting two or more superimposed bubbles, adjacent bubbles being separated by a substantially horizontal web, and each bubble except the uppermost one having a smaller cross-sectional area than the one immediately above, said flexible container being constructed and arranged to be inflated by gaseous fluid under pressure, and being provided with vents for the escape of said gaseous fluid and of any water that may find its way into the container, said keel being a fore and aft keel with the container made in lengths, adjacent lengths being joined by a lap joint arranged to provide gaps between the overlapping ends of the lengths to form said vents.

10. A ground effect machine of the type which, during at least one mode of operation, is wholly or partly supported by a pressurized gaseous cushion formed and contained beneath the machine, said machine having at least one keel which comprises an elongated flexible container depending downwardly from the machine within the cushion area, the vertical cross-section of said keel being bulbous over at least a substantial portion of the length of the keel, the bulbous cross-section presenting two or more superimposed bubbles, adjacent bubbles being separated by a substantially horizontal member, and each bubble except the uppermost one having a smaller cross-sectional area than the one immediately above, said flexible container being constructed and arranged to be inflated by gaseous fluid under pressure, and being provided with vents for the escape of said gaseous fluid and of any water that may find its way into the container, a peripheral skirting having a nozzle through which air or other gas for the cushion is delivered, the said keel extending fore and aft between the fore and aft portions of the skirting, and stability keels provided between the sides of the said keel and the sides of the skirting, said stability keels being inclined downwardly and toward the aft end of the vehicle or machine.

References Cited by the Examiner

UNITED STATES PATENTS

| 3,168,069 | 2/1965 | Everest et al. | 180—7 X |
| 3,172,494 | 3/1965 | Cockerell | 180—7 |
| 3,191,705 | 6/1965 | Jones et al. | 180—7 |

FOREIGN PATENTS

| 1,294,036 | 4/1962 | France. | |

BENJAMIN HERSH, *Primary Examiner.*

M. S. SALES, *Assistant Examiner.*